(12) United States Patent
Aviani, Jr. et al.

(10) Patent No.: US 7,016,958 B1
(45) Date of Patent: *Mar. 21, 2006

(54) METHODS AND APPARATUS FOR REDIRECTING NETWORK CACHE TRAFFIC

(75) Inventors: James A. Aviani, Jr., Santa Barbara, CA (US); Martin K. Cieslak, Fremont, CA (US); Martin A. Kagan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/354,906

(22) Filed: Jan. 28, 2003

Related U.S. Application Data

(63) Continuation of application No. 09/183,600, filed on Oct. 29, 1998, now Pat. No. 6,532,493.

(51) Int. Cl.
 *G06F 15/16* (2006.01)
(52) U.S. Cl. .................... 709/224; 709/245; 370/94.1; 711/118; 711/122
(58) Field of Classification Search ............... 709/220, 709/224, 226, 228, 227, 245; 370/396, 397, 370/94.1; 711/118, 138, 160, 122
See application file for complete search history.

(56) References Cited

U.S. PATENT DOCUMENTS

| 4,827,411 | A | | 5/1989 | Arrowood et al. ......... 364/300 |
|---|---|---|---|---|
| 4,965,772 | A | | 10/1990 | Daniel et al. ............... 364/900 |
| 5,278,829 | A | | 1/1994 | Dunlap ...................... 370/94.1 |
| 5,555,244 | A | | 9/1996 | Gupta et al. ............... 370/60.1 |
| 5,581,764 | A | * | 12/1996 | Fitzgerald et al. .......... 709/223 |
| 5,600,798 | A | | 2/1997 | Cherukuri et al. .......... 709/203 |
| 5,673,265 | A | | 9/1997 | Gupta et al. ................ 370/432 |
| 5,905,872 | A | | 5/1999 | DeSimone et al. ......... 709/245 |
| 6,021,426 | A | | 2/2000 | Douglis et al. ............. 709/200 |
| 6,021,470 | A | * | 2/2000 | Frank et al. ................ 711/138 |
| 6,052,372 | A | | 4/2000 | Gittins et al. ............... 370/396 |
| 6,055,572 | A | | 4/2000 | Saksena ...................... 709/224 |
| 6,119,171 | A | | 9/2000 | Alkhatib ..................... 709/245 |
| 6,130,889 | A | | 10/2000 | Feldman et al. ............ 370/397 |
| 6,154,738 | A | * | 11/2000 | Call ............................... 707/4 |
| 6,189,042 | B1 | | 2/2001 | Keller-Tuberg ............. 709/238 |
| 6,292,889 | B1 | * | 9/2001 | Fitzgerald et al. ............. 713/1 |
| 6,385,693 | B1 | * | 5/2002 | Gerszberg et al. .......... 711/118 |
| 6,463,474 | B1 | * | 10/2002 | Fuh et al. ................... 709/225 |
| 6,499,088 | B1 | * | 12/2002 | Wexler et al. .............. 711/152 |
| 6,532,493 | B1 | * | 3/2003 | Aviani et al. ............... 709/224 |
| 6,625,657 | B1 | * | 9/2003 | Bullard ....................... 709/237 |
| 6,683,873 | B1 | * | 1/2004 | Kwok et al. ................ 370/389 |
| 6,718,540 | B1 | * | 4/2004 | Azua et al. ................. 717/148 |

(Continued)

OTHER PUBLICATIONS

Liang et al., Transparent Distributed Web Caching, Feb. 2001, IEEE, pp. 225-233.*

(Continued)

*Primary Examiner*—Khanh Dinh
(74) *Attorney, Agent, or Firm*—Beyer Weaver & Thomas, LLP

(57) ABSTRACT

A method for routing a data request received by a caching system is described. The caching system includes a router and a cache, and the data request identifies a source platform, a destination platform, and requested data. Where the source and destination platforms correspond to an entry in a list automatically generated by the caching system, the data request is transmitted without determining whether the requested data are stored in the cache.

29 Claims, 5 Drawing Sheets

U.S. PATENT DOCUMENTS 6,745,243 B1 * 6/2004 Squire et al. ............... 709/227
6,748,447 B1 * 6/2004 Basani et al. ............... 709/244

OTHER PUBLICATIONS

Hassanein et al, Performance Comparision of Alternative Web Caching Techniques, ISCC'02, IEEE.*

Valloppillil, Vinod, "Cache Array Routing Protocol v1.0", Oct. 20, 1997, Internet-Draft, http://ds1.internic/net/internet-drafts/draft-vinod-carp-v1-02.txt, pp. 1-6.

Cisco Technology, Inc., "Configuring IP Routing Protocols," Dec. 10, 1997, http://www.cisco.com/univercd/data/doc/software/11_2/cnp1/5ciprout.htm#REF40277, pp. 1-6 and 120-122.

Ousterhout, John K., et al. "A Trace-Driven Analysis of the UNIX 4.2 BSD File System," Jan. 2, 1993, *Computer Science Division, Electrical Engineering and Computer Science*, University of California, Berkeley, CA, pp. 1-12.

Ousterhout, John K., et al. "Beating the I/O Bottleneck: A Case for Log-Structured File Systems," Jan. 30, 1992, *Computer Science Division, Electrical Engineering and Computer Sciences*, University of California, Berkeley, CA, pp. 1-18.

Welch, Brent, "A Comparison of the Vnode and Sprite File System Architectures," *Proceedings of the USENIX File System Workshop*, May 1992, 18 pages.

Martin Arlitt, Ludmila Cherkasova, John Dilley, Rich Friedrich and Tai Jin, OF Hewlett-Packard Laboratories, "Evaluating Content Management Techniques for Web Proxy Caches", Apr. 30, 1999, 9 pages.

* cited by examiner

METHODS AND APPARATUS FOR REDIRECTING NETWORK CACHE TRAFFIC

This is a Continuation application of prior application Ser. No. 09/183,600 filed on Oct. 29, 1998 now U.S. Pat. No. 6,532,493.

BACKGROUND OF THE INVENTION

The present invention relates generally to networking technology. More specifically, the present invention relates to the caching of data objects to accelerate access to, for example, the World Wide Web. Still more specifically, the present invention provides methods and apparatus by which caching systems may be made to coexist with servers which require user authentication for access.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80; a well known port for HTTP and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident daemon which then made the connection to a destination platform at the client's request. The daemon then passed information back and forth between the client and destination platforms acting as an intermediary or "proxy".

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

A similar idea led to the development of network caching systems. Network caches are employed near the router of a network to accelerate access to the Internet for the client machines on the network. An example of such a system is described in commonly assigned, copending U.S. patent application Ser. No. 08/946,867 for METHOD AND APPARATUS FOR FACILITATING NETWORK DATA TRANSMISSIONS filed on Oct. 8, 1997, the entire specification of which is incorporated herein by reference for all purposes. Such a cache typically stores the data objects which are most frequently requested by the network users and which do not change too often. Network caches can provide a significant improvement in the time required to download objects to the individual machines, especially where the user group is relatively homogenous with regard to the type of content being requested. The efficiency of a particular caching system is represented by a metric called the "hit ratio" which is a ratio of the number of requests for content satisfied by the cache to the total number of requests for content made by the users of the various client machines on the network. The hit ratio of a caching system is high if its "working set", i.e., the set of objects stored in the cache, closely resembles the content currently being requested by the user group.

The network cache described in the above-referenced patent application operates transparently to the client network. It accomplishes this in part by "spoofing" the server from which content is requested. That is, if the requested content is in the cache it is sent to the requesting client platform with a header indicating it came from the server having the original content. Even where the requested content is not in the cache, the cache retrieves the original content from the server for which the request was intended, stores it, and then transmits the content from the cache to the requesting client, again indicating that the transmitted data are from the originating server.

As will be understood, some web servers only allow access to real clients. That is, such servers will not transmit requested content in response to a request from a network cache. Only direct requests from the client are honored. Thus, a connection from a cache is rejected and the request is either sent back with an appropriate message in the HTTP header, or the request is simply not answered. Unfortunately, a subsequent request for the same information will go through the same cache with a similar end result. This problem may be solved for a particular cache by configuring the associated router to bypass requests corresponding to certain client/destination pairs as identified by the packet's HTTP header. That is, the system administrator can add access control lists (ACLs) into the router such that data requests which have previously been identified may be passed through the router without being routed through the associated cache.

However, while this may prove somewhat effective in limited circumstances, it destroys the transparency with which the cache is intended to operate. That is, the system administrator needs to monitor rejected requests and manually reconfigure the router, while users on the client network experience, at least temporarily, frustrating limitations on access to desired content until the router ACL is appropriately modified. Moreover, such a solution cannot work in multi-layer networks which do not share administration. As will be appreciated, this is a significant limitation in that this describes most of the world's networking infrastructure.

The problem with the multi-layer or hierarchical network is that there are likely to be more than one cache in between the requesting client and the destination server storing the requested content. Thus, unless each of the upstream caches and/or routers are configured to bypass certain requests, the connection will continue to be rejected until all of the independent reconfigurations occur. This is clearly not an acceptable solution.

It is therefore desirable that a technique is provided by which requests to servers requiring real client access may be made to bypass all upstream network caches in a manner which is transparent to both users and network administrators.

SUMMARY OF THE INVENTION

According to the present invention, methods and apparatus are provided which enable caching systems in hierarchical networks to recognize data requests headed for destination servers requiring real client access, and to pass such requests through without engaging in the standard caching protocol. The process by which this is accomplished is transparent to the requesting client platform and the system administrator and therefore preserves one of the key features of most caching systems.

When a client platform initially transmits a request specifying a destination platform which requires real client access, an upstream caching system comprising a cache-enabled router and a network cache handles the request as it would any other request. That is, if the request meets certain criteria, e.g., the packet specifies port 80 as the destination port, the router sends it to the associated cache which then determines whether the requested content is present in the cache. Obviously, because of the nature of the destination platform, the requested content is not likely to be in the cache. The cache then attempts to establish a connection to the destination server to retrieve the content.

In attempting to establish the connection to the destination server, the cache crafts a request in which the original client platform from which the request originated is identified. According to a specific embodiment, this information is added to the HTTP header. As will become apparent, the insertion of this identifying information facilitates operation of the invention in a hierarchical environment. Any upstream caching system will handle the modified request according to its standard protocol.

Ultimately, the attempted connection with the destination server by the last cache in the upstream path is rejected. The destination server responds to the last cache with an appropriate message indicating, for example, that the request requires authentication or that authentication had failed. The cache sends a message to its associated router instructing it not to redirect any further requests from the originating client to the destination server, and an entry is made in a table of client/server pairs for which requests are to be bypassed. The cache then sends a message to the originating client platform instructing it to resend the request to the same destination platform. Any intervening downstream caching systems receive this message, add the client/server pair to a resident bypass table, and transmit the resend message to the originating client platform.

In response to the resend message, the client platform retransmits the original request to the same destination platform. For this retransmission, each of the upstream caching systems now recognizes the request as one which should be passed through the cache by reference to its resident bypass table. In this way, the request is able to make it all the way to the specified destination where it is handled appropriately.

Thus, the present invention provides methods and apparatus for routing a data request received by a caching system. The caching system includes a router and a cache, and the data request identifies a source platform, a destination platform, and requested data. Where the source and destination platforms correspond to an entry in a list automatically generated by the caching system, the data request is transmitted without determining whether the requested data are stored in the cache.

According to a specific embodiment of the invention, when it is determined that the requested data are not in the cache, an attempt to establish a connection between the cache and the destination platform is made. Upon receiving notification that the connection has failed, an entry corresponding to the source and destination platforms is automatically stored in a list generated by the caching system. The source platform is then prompted to transmit a second data request for the requested data. In response to the entry in the list, the second data request is passed through the caching system without determining whether the requested data are stored in the cache.

According to another specific embodiment, the data request has a header associated therewith containing a data field. Where the data field corresponds to a first entry in a first list associated with caching system, a second entry corresponding to the source and destination platforms is automatically stored in a second list generated by the caching system. The source platform is then prompted to transmit a second data request for the requested data. In response to the second entry in the second list, the second data request is passed through the caching system without determining whether the requested data are stored in the cache.

A further understanding of the nature and advantages of the present invention may be realized by reference to the remaining portions of the specification and the drawings.

DESCRIPTION OF SPECIFIC EMBODIMENTS

Figure 1:
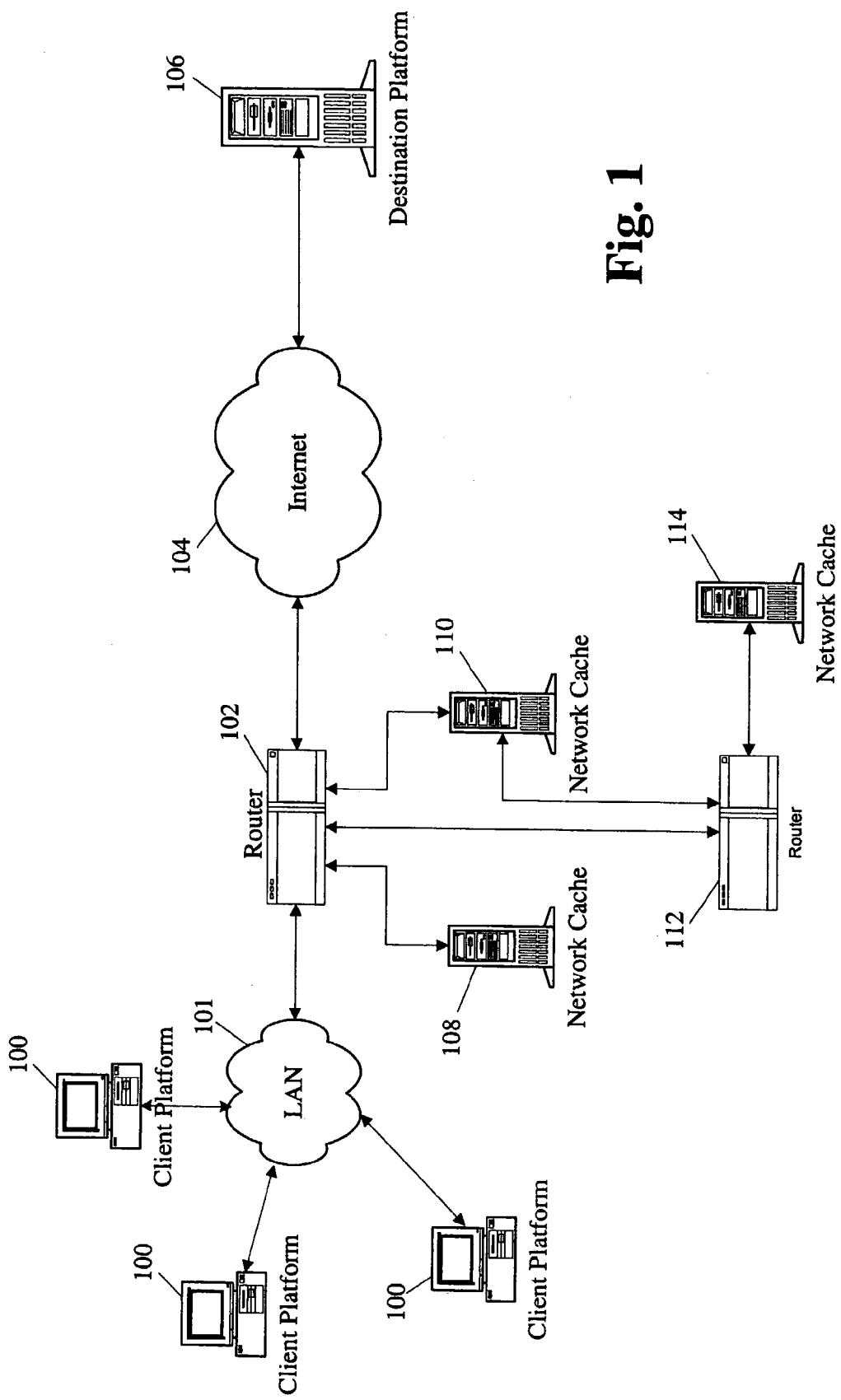
FIG. 1 is a diagram of a hardware environment according to a specific embodiment of the invention.

FIG. 1 shows a hardware environment in which the present invention may be implemented. A plurality of client platforms 100 are interconnected via LAN 101. LAN 101 is connected to router 102 which is connected via network 104 to destination platform 106. It will be assumed for the purposes of this discussion that client platforms 100 are single personal computers or work stations, that router 102 connects platform 100 to the Internet, i.e., network 104, and that destination platform 106 is a server on the World Wide Web. It should be noted, however, that a variety of configurations similar to this simple model may be employed without departing from the scope of the invention. For example, client platforms 100 could be connected via a wide area network. Router 102 could be an internal router in a LAN or a WAN (e.g., an intranet connection to an internal web page), the network's general gateway to the Internet, a direct connection to destination platform 106, or some intermediate platform between the network and destination platform 106. The connection between router 102 and client platforms 100 could include several intervening routers. Network 104 could represent a local or wide area network which includes client platforms 100 and router 102, or the Internet. Destination platform 106 could be part of the local or wide area network, or a remote server on the Internet. Referring back to FIG. 1, network caches 108 and 110 are connected to router 102. Additional router 112 is connected to router 102 and has an additional network cache 114 connected thereto.

It will be understood that the network caches described herein may employ any of a variety of existing file systems and remain within the scope of the invention. For example, the invention may be implemented using a Unix general purpose file system or the equivalent. A particular embodiment of the invention employs the file system described in commonly assigned, copending U.S. patent application Ser. No. 08/937,966 for CACHE MEMORY FILE SYSTEM filed on Sep. 25, 1997, the entire specification of which is incorporated herein by reference for all purposes.

During normal operation, i.e., where traffic is not intended for a server requiring real client access, a client platform 100 transmits a request to retrieve data such as, for example, a multimedia object from destination platform 106. Cache-enable router 102 receives the request in the form of at least one data packet. Router 102 reads the packet header to determine whether, for example, it is a TCP packet and indicates port 80 as its destination port. If the packet is of a different protocol or is not destined for the World Wide Web, the packet is simply passed through the router and routed according to standard Internet protocols.

If, on the other hand, the packet is TCP and port 80 is specified, router 102 determines to which of its associated network caches (108 and 110) it will redirect the packet based on the destination IP address specified in the packet. Before sending the packet to one of its associated network caches, router 102 encapsulates the packet for transmission to the selected network cache by adding another TCP/IP header which designates the router as the source of the packet and the network cache as the destination. That is, the router encapsulates the packet for transmission to a network cache which might be several "hops" away. So, for example, router 102 might encapsulate the packet for transmission to network cache 114 which is connected to router 102 via router 112. Thus, not only may multiple network caches be associated with a particular router, but multiple routers may be supported by an individual network cache or a group of network caches. This allows a tremendous amount of flexibility in where the network cache and router need to be in relation to each other.

Router 102 opens a TCP connection between the client and the selected network cache and transmits the encapsulated packet to the network cache. The network cache determines if it has the requested object stored locally by comparing the packet URL to its directory. If the object is not in the cache, the network cache makes its own request for the object (using its own address as the source IP address) to destination platform 106 via router 102. That is, router 102 establishes a TCP connection between the network cache and destination platform 106. The router sees that the new request is from the network cache (by looking at the source address) and thereby knows not to redirect the packet to the network cache. This request and the subsequent retrieval of the object from destination platform 106 is done according to standard TCP/IP protocols. The retrieved object is then placed in the memory of the network cache and transmitted to client platform 100. If, on the other hand, the object is determined to be locally stored in the network cache, it is transmitted to client platform 100.

Figure 2:
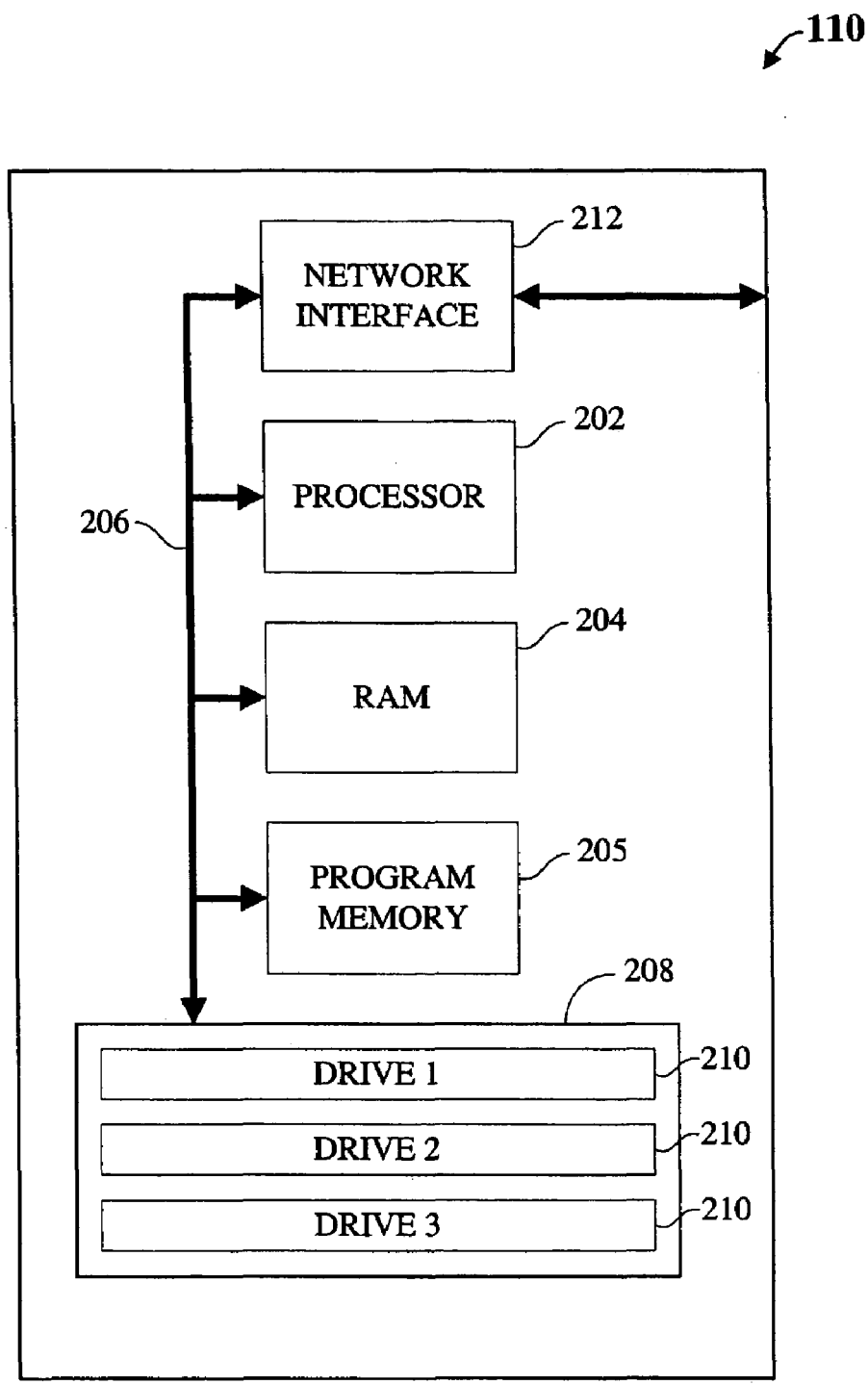
FIG. 2 is a block diagram of a caching system according to a specific embodiment of the invention.

FIG. 2 is a block diagram of a network cache such as, for example, cache 110 of FIG. 1. A central processor 202 controls operation of cache 110 and its various subsystems using system memory 204 and bus 206. Data objects are stored in cache memory 208 which, in a specific embodiment, comprises three SCSI drives 210. A network interface 212 enables communication with external devices. Portions of SCSI drives 210 may also be employed for other purposes such as, for example, storing operating and file systems for cache 110, or storing software code for directing the operation of various functionalities of cache 110. Alternatively, program instructions for execution by processor 202 directing operation of the functionalities of cache 110 may be stored in a separate program memory 205. It will be understood that the cache architecture shown in FIG. 2 is merely illustrative and should not be construed to limit the scope of the present invention. That is, any of a wide variety of cache architectures may be employed to implement the present invention.

Figure 3:
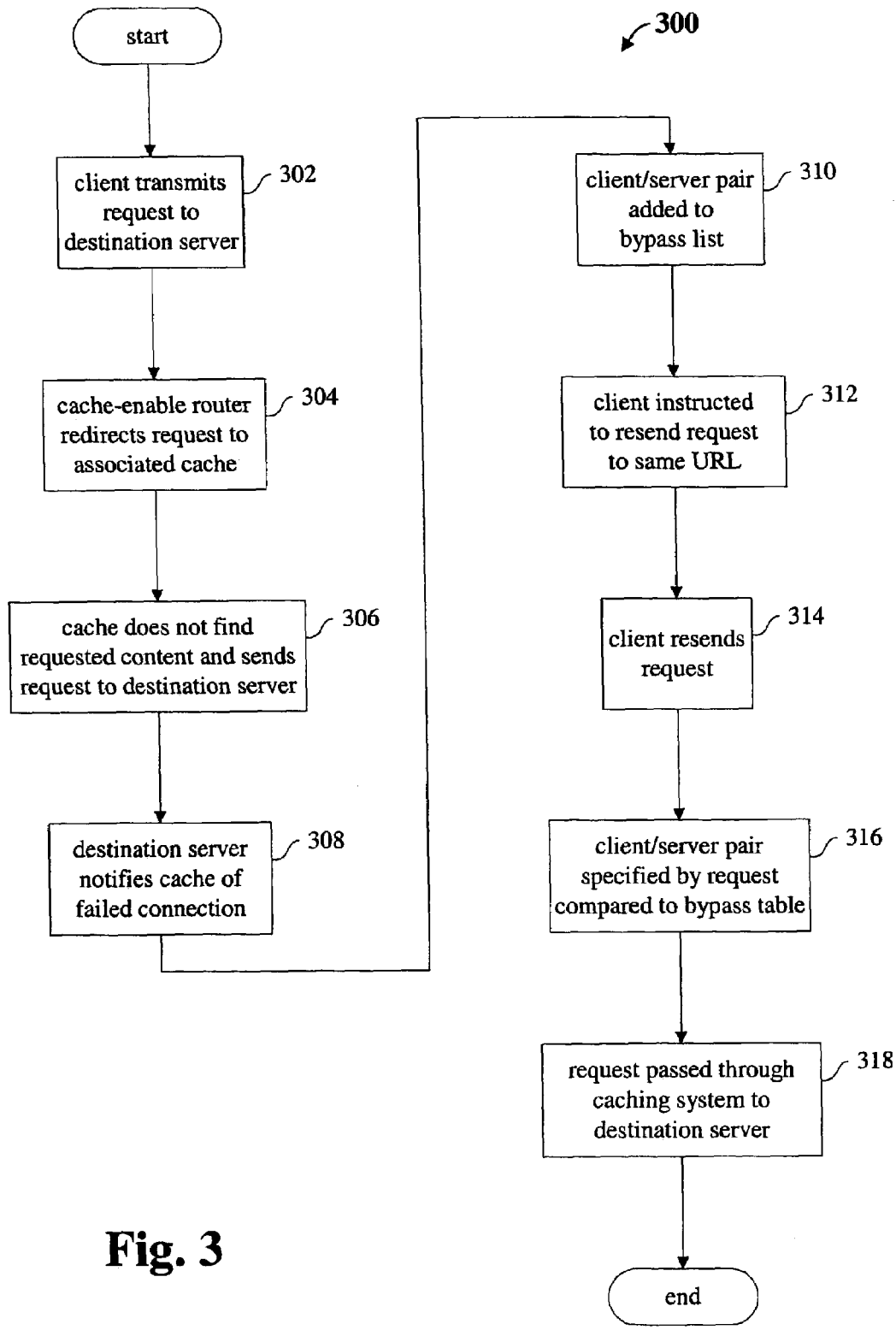
FIG. 3 is a flowchart illustrating handling of a request specifying a destination platform requiring user authentication according to a specific embodiment of the invention.

FIG. 3 is a flowchart 300 illustrating handling of a request specifying a destination platform requiring user authentication according to a specific embodiment of the invention. Initially, a source or client platform, e.g., client platform 100 of FIG. 1, transmits the data request to the destination platform, e.g., destination platform 106 of FIG. 1, (302). The request is received by a cache-enabled router, i.e., a router which automatically routes particular requests to an associated cache such as router 102 of FIG. 1, and redirects the request to its associated cache, e.g., cache 110 of FIG. 1 (304). The router may be, for example, the client platform's gateway or any upstream router between the client and the destination.

The cache then determines whether the requested content is currently resident in the cache. Because the destination platform requires user authentication, the requested content is determined not to be in the cache, at which point the cache attempts to open its own connection to the destination platform by which the request may be transmitted (306). As part of the attempt to establish the connection, the cache modifies the HTTP header so that the original client platform is identified for any subsequent caching systems encountered by the request. That is, the modified HTTP header includes information identifying the original source of the request so that the original client/server pair can be identified by any upstream routers and/or caches.

Again, because the destination platform requires user authentication, the connection is rejected and the cache is notified of the failed connection (308). Notification may come, for example, in the form of a 401 response in the HTTP header. The 401 response indicates the request requires user authentication. Alternatively, notification may come in the form of a 403 response in the HTTP header which indicates that an authentication failure has occurred. In any case, regardless of the manner in which the notification occurs, the cache is alerted to the fact that a connection between the cache and the destination platform cannot be effected because user authentication is required.

An entry corresponding to the combination of the original client and destination platforms, i.e., the original client/server pair, is then made in a bypass list (310). The original client and destination platforms, i.e., client/server pair, are identified by the entry in the modified HTTP header identifying the original client platform. The bypass list contains entries corresponding to client/server pairs which should be allowed to pass through the caching system without determining whether the requested data are in the cache. According to a specific embodiment, the bypass list is resident in the cache itself. According to another embodiment, the bypass list is resident in the associated router so that requests corresponding to entries in the bypass list need not be redirected to the cache at all. The manner in which an entry is inserted into the bypass list may also vary without departing from the scope of the invention. For example, upon receiving notification of the failed connection to the destination server, the cache can effect the addition to the bypass list whether the list is resident in the cache or the router. Similarly, the router may effect the addition to the bypass list whether the list is resident in the cache or the router.

Once the bypass list has been modified to include the original client/server pair corresponding to the request, the cache send a message instructing the original client platform to retransmit the request to the same destination platform URL (312). According to a specific embodiment, this is done using a 302 response in the HTTP header which informs the client that the requested destination resides temporarily under a different URL. However, in this case, the original destination platform URL is given. Any downstream caching systems (routers and/or caches) recognize the 302 response in the HTTP header coupled with the information regarding the original client and make the appropriate entries into their bypass lists.

In response to the 302 message from the cache, the client retransmits the original request to the same destination URL (314). Upon reception of the new request by the same caching system, the client/server pair identified by the HTTP header is compared to the resident bypass list (316). That is, either the router or the associated cache makes the comparison depending upon the protocol employed and/or where the bypass list is maintained. Because there is now an entry corresponding to the client/server pair, the normal caching protocol is not performed and the request is transmitted to the destination platform (318). That is, the requested data are not looked for in the cache and the request header is not modified in the manner described above. According to one embodiment, the request is simply passed through the router without being redirected to the cache. According to another embodiment, the request is redirected to the cache but is bounced back to the router and on to the destination without being subjected to the normal caching protocol.

Figure 4:
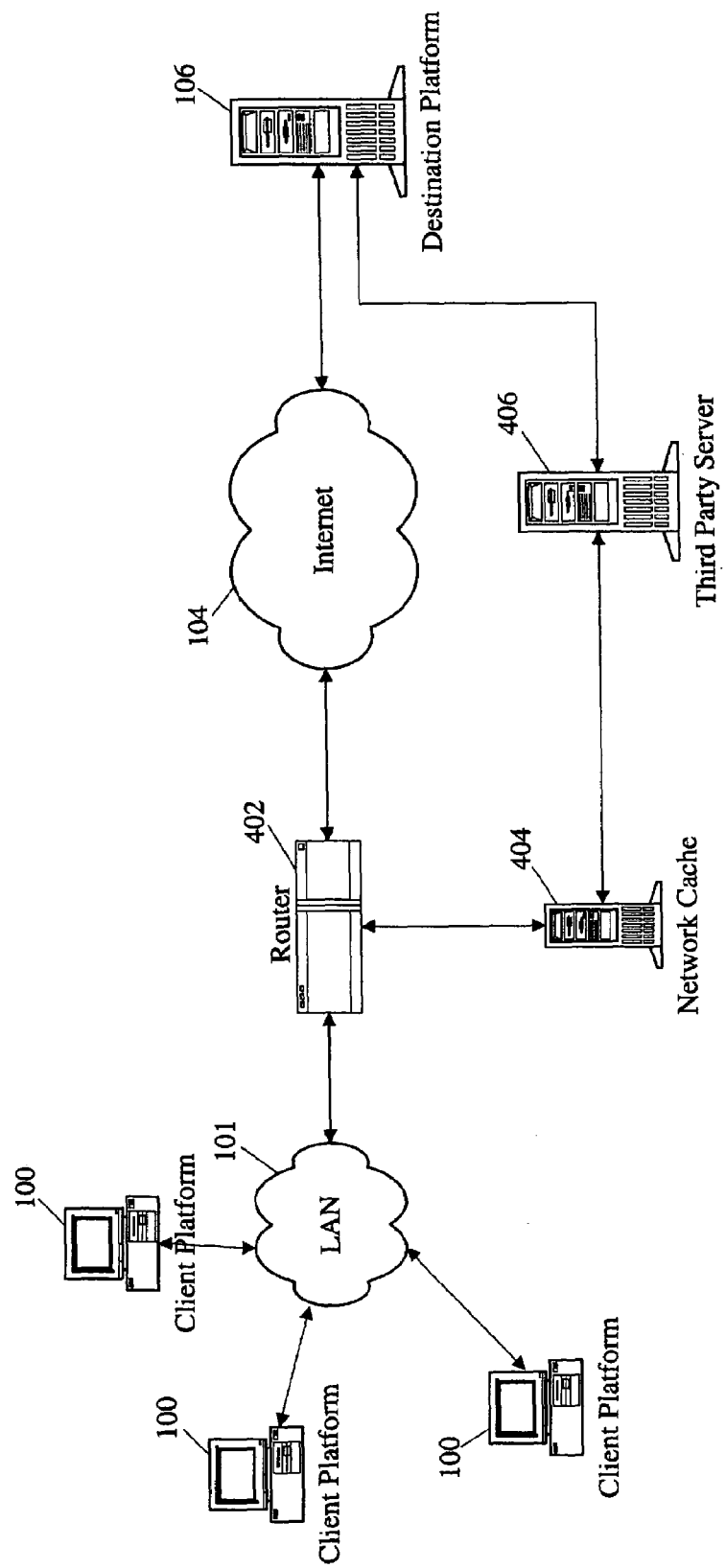
FIG. 4 is a diagram of a hardware environment according to another specific embodiment of the invention.

FIG. 4 is a hardware environment in which another specific embodiment of the invention may be implemented. The diagram contains some of the same elements shown in FIG. 1 each having the same reference designation and operating in substantially the same manner as described above with reference to its FIG. 1 counterpart. Router 402 and network cache 404 replace router 102 and cache 110, respectively. Also included in the diagram is a third party server 406 which is coupled to both network cache 404 and destination platform 106. This embodiment of the invention addresses situations in which it is desirable to redirect certain types of data traffic such as, for example, HTTP traffic, to a third party server or software device as opposed to bypassing as described above. This provides the very important advantage of allowing a closed platform cache to communicate with third party software devices.

For certain types of devices, e.g., palmtops (and associated browsers) and low speed modems, special processing is required in order to display data and view images intended for desktop PCs. For example, an image distillation service takes images from servers which provide such content and converts them into a format which is usable by a low speed modem. In another example, an HTML "munging" service make HTML displayable in the palmtop environment. In yet another example, special processing for self-referenced XML pages is performed prior to sending the pages to the requesting platform. In still another example, multi-language support is provided. Third party server 406 represents a server which provides these or similar services.

As will be discussed in greater detail with reference to FIG. 5, this embodiment of the invention allows a caching system to recognize certain types of traffic by reference to, for example, the HTTP header, and to redirect that traffic to an appropriate server which provides services required by that traffic. Providers of such services could, for example, register with a particular caching system to shunt particular types of traffic to their server. When, during the normal course of operation, a caching system receives a particular type of request which has been identified by a registered service, an entry corresponding to the client/server pair is added to a bypass list and the original client is instructed to resend the request. When the second request reaches the caching system it is shunted to the appropriate service provider as dictated by the bypass list. One advantage of such a technique is that it is obviously much quicker and more manageable than one in which the special processing service provider registers with every content provider.

Figure 5:
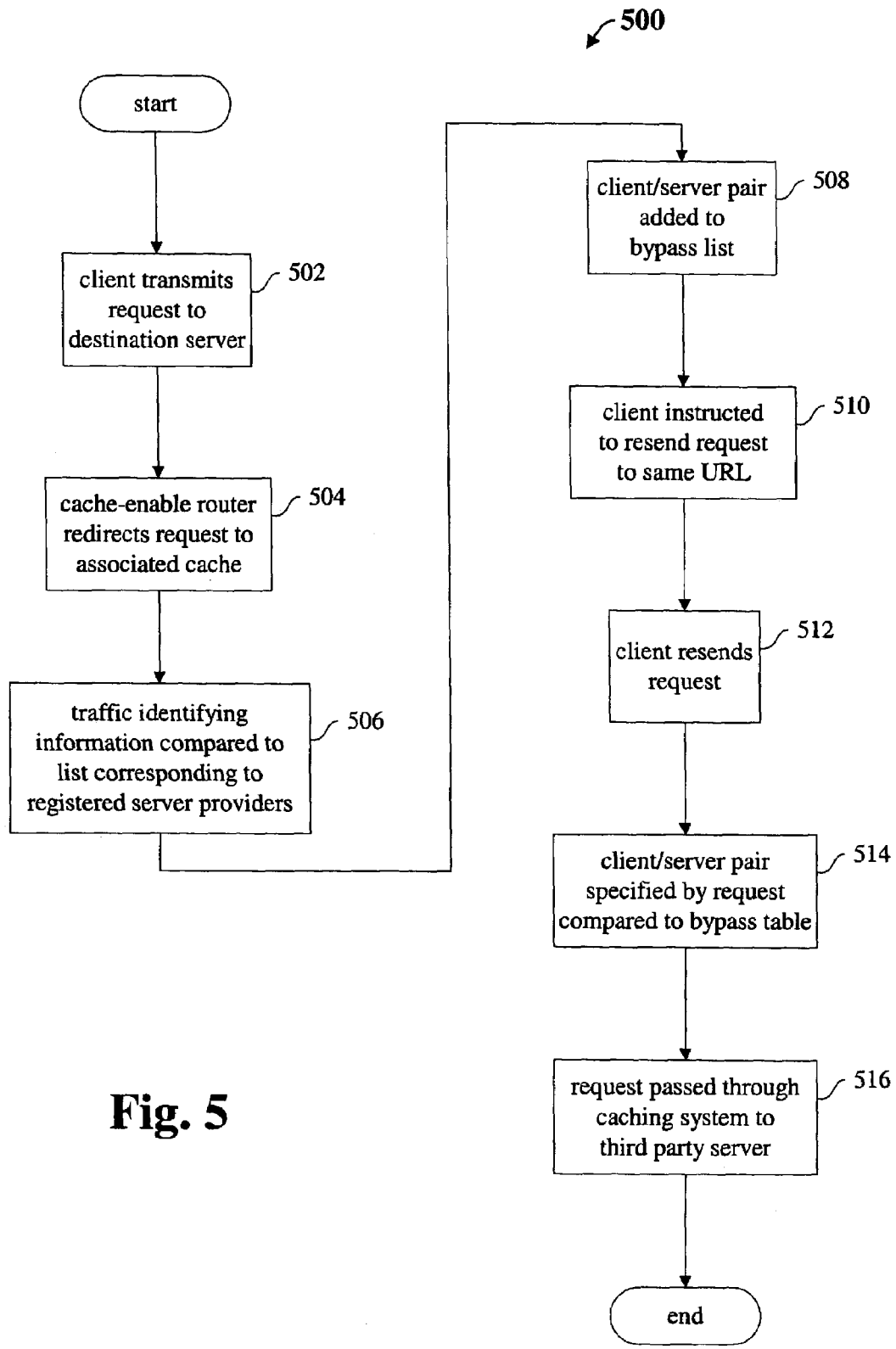
FIG. 5 is a flowchart illustrating handling of a request from a particular type of device.

FIG. 5 is a flowchart 500 illustrating handling of a request from a particular type of device for which special processing or other services are required. Initially, a source or client platform, e.g., client platform 100 of FIG. 4, transmits the data request to the destination platform, e.g., destination platform 106 of FIG. 4, (502). The request is received by a cache-enabled router, i.e., a router which automatically routes particular requests to an associated cache such as router 402 of FIG. 4, and redirects the request to its associated cache, e.g., cache 404 of FIG. 4 (504). The router may be, for example, the client platform's gateway or any upstream router between the client and the destination.

Identifying information associated with the request is compared to a registered service provider list to determine whether the traffic corresponds to any registered third party service providers (506). According to a specific embodiment, this identifying information is in the request's HTTP header. According to a more specific embodiment, the identifying information is the user agent field in the HTTP header. According to other embodiments, other fields may be introduced into the HTTP header upon which the present invention may trigger. If the traffic corresponds to an entry in the register service provider list, the specific client/server pair as identified in the HTTP header is added to the bypass list for future redirection (508). So, for example, if the user agent field indicates that the request came from a palmtop browser for which image distillation is required, and if a suitable image distillation service has registered with the caching system for diversion of such traffic, then the traffic will be added to the bypass list. Alternatively, providers of palmtop browsers, low-speed modems, and other devices requiring special processing could be instructed to provide specific fields in the HTTP header to take advantage of special processing services through the mechanism described herein. This approach is advantageous in that it offers great flexibility and the addition of fields to the HTTP header is not only permissible, but easily implemented.

Once the client/server pair has been added to the bypass list, the cache send a message instructing the original client platform to retransmit the request to the same destination platform URL (510). As discussed above with reference to FIG. 3, this may be done using a 302 response in the HTTP header which informs the client that the requested destination resides temporarily under a different URL.

In response to the 302 message from the cache, the client retransmits the original request to the same destination URL (512). Upon reception of the new request by the same caching system, the client/server pair identified by the HTTP header is compared to the resident bypass list (514). That is, either the router or the associated cache makes the comparison depending upon the protocol employed and/or where the bypass list is maintained. Because there is now an entry corresponding to the client/server pair, the normal caching protocol is not performed and the request is transmitted instead to the third party server identified in the registered service provider list, e.g., third party server 406 of FIG. 4 (516). The third party server can then get the request content from the originally specified destination server, e.g., server 106 of FIG. 4, and perform the necessary processing before transmitting the processed content to the client.

While the invention has been particularly shown and described with reference to specific embodiments thereof, it will be understood by those skilled in the art that changes in the form and details of the disclosed embodiments may be made without departing from the spirit or scope of the invention. For example, various aspects of the technique described herein have been described as being performed by either a router or the associated cache. It should be understood, however, that most of the described function may be performed by either of these devices and that the invention also pertains to the operation of the caching system, i.e., the combination of the router and the cache, as a whole. This provides a great deal of flexibility with regard to implementation of the invention. For example, it is possible to implement the invention without modification to any router software. That is, all of the functions described could be implemented in the cache. This is particularly advantageous where the router and cache come from different manufacturers. Alternatively, some of the functions of the present invention may be implemented by modification of the router system software. For example, the router may be modified to maintain the bypass list. This approach has the advantage of eliminating any latency due to unnecessary detours through the cache. Therefore, the scope of the invention should be determined with reference to the appended claims.

What is claimed is:

1. A method for routing a data request received by a caching system comprising a router and a cache, the data request identifying a source platform, a destination platform, and requested data, the method comprising, wherein the source and destination platforms correspond to an entry in a bypass information list automatically generated by the caching system, transmitting the data request without determining whether the requested data are stored in the cache, wherein the entry in the list is automatically generated after an attempt to establish a connection between the cache and the destination platform has failed.

2. The method of claim 1 wherein each entry in the by information list corresponds to a destination platform for which user authentication is required.

3. The method of claim 1 wherein each entry in the bypass information list corresponds to a source platform for which special processing of the requested data is required.

4. The method of claim 1 wherein automatically generating the entry in the bypass information list further comprises:
receiving a first transmission corresponding to the data request;
determining that the requested data are not in the cache.

5. The method of claim 4 wherein notification that the connection has failed comprises a 401 response in an HTTP header associated with the data request.

6. The method of claim 4 wherein notification that the connection has failed comprises a 403 response in an HTTP header associated with the data request.

7. The method of claim 1 wherein transmitting the data request comprises:
prompting the source platform to retransmit the data request; and
in response to the entry in the bypass information list, passing the retransmitted data request through the caching system without whether the requested data are stored in the cache.

8. The method of claim 7 wherein prompting the source platform to retransmit the data request comprises transmitting a 302 response to the source platform in an HTTP header associated with the data request.

9. The method of claim 1 wherein the list resides in the cache.

10. The method of claim 1 where the list resides in the router.

11. The method of claim 1 wherein transmitting the data request comprises attempting to establish a connection between the cache and the destination platform, the attempted connection identifying the source and destination platforms to upstream caching systems.

12. The method of claim 11 wherein identification of the source and destination platforms to upstream caching systems comprises a modification to a header associated with the data request which identifies the source platform regardless of subsequent encapsulation.

13. The method of claim 10 wherein the header comprises an HTTP header.

14. The method of claim 1 wherein the list is automatically generated according to a method comprising, where a data field in a header associated with the data request corresponds to a second entry in a second bypass information list associated with caching system, automatically storing the entry in the bypass information list.

15. The method of claim 14 wherein the header comprises an HTTP header.

16. The method of claim 14 wherein the data field indicates whether the source platform requires special processing of the requested data.

17. The method of claim 14 wherein the second bypass information list comprises a plurality of entries each corresponding to a type of platform for which special processing of transmitted content is required.

18. The method of claim 17 wherein each of the plurality of entries in the second bypass information list also corresponds to third party software which provides the special processing required by the corresponding type of platform.

19. The method of claim 18 wherein the third party software comprises HTML munging software.

20. The method of claim 18 wherein the third party software comprises XML processing software.

21. The method of claim 18 wherein the third party software comprises image distillation software.

22. The method of claim 18 wherein the third party software comprises multi-language support software.

23. The method of claim 17 wherein the second list resides in the cache.

24. The method of claim 17 wherein the second list resides in the router.

25. The method of claim 14 wherein transmitting the data request comprises, in response to the entry in the list, diverting the data request to a third party platform corresponding to the second entry in the second list.

26. A method for routing a first data request received by a caching system comprising a router and a cache, the first data request identifying a source platform, a destination platform, and requested data, the method comprising:
   determining that the first requested data are not in the cache;
   attempting to establish a connection between the cache and the destination platform;
   in response to receiving notification that the connection has failed, automatically maintaining bypass information for the source and destination pair;
   prompting the source platform to transmit a second data request for the requested data, the second data request identifying the source and destination platforms; and
   in response to the entry in the list, passing the second data request through the caching system without determining whether the requested data are stored in the cache.

27. A method for routing a data request received by a first caching system comprising a router and a cache, the data request identifying a source platform, a destination platform, and requested data, the method comprising:
   determining that the requested data are not in the cache; and
   attempting to establish a connection between the cache and the destination platform, the attempted connection identifying the source and destination platforms to upstream caching systems to allow upstream caching systems to maintain bypass information for the source and destination pair, wherein bypass information is automatically generated after an attempt establish a connection between the cache and the destination platform has failed.

28. A system for routing a first data request received by a caching system comprising a router and a cache, the system comprising:
   means for determining that requested data are not in the cache;
   means for attempting to establish a connection between the cache and a destination platform;
   means for automatically maintaining bypass information list for a source and destination pair after receiving notification that the connection has failed;
   means for prompting the source platform to transmit a second data request for the requested data, the second data request identifying the source and destination platforms; and
   means for passing the second data request through the caching system without determining whether the requested data are stored in the cache after identifying the entry in the bypass information list.

29. A computer readable medium comprising computer code for routing a first data request received by a caching system comprising a router and a cache, the computer readable medium comprising:
   computer code for determining that requested data are not in the cache;
   computer code for attempting to establish a connection between the cache and a destination platform;
   computer code for automatically maintaining bypass information list for a source and destination pair after receiving notification that the connection has failed;
   computer code for prompting the source platform to transmit a second data request for the requested data, the second data request identifying the source and destination platforms; and
   computer code for passing the second data request through the caching system without determining whether the requested data are stored in the cache after identifying the entry in the bypass information list.

* * * * *